June 8, 1937.    E. G. HILL    2,083,530
CLUTCH CONTROL MECHANISM
Filed Oct. 22, 1934    2 Sheets-Sheet 1
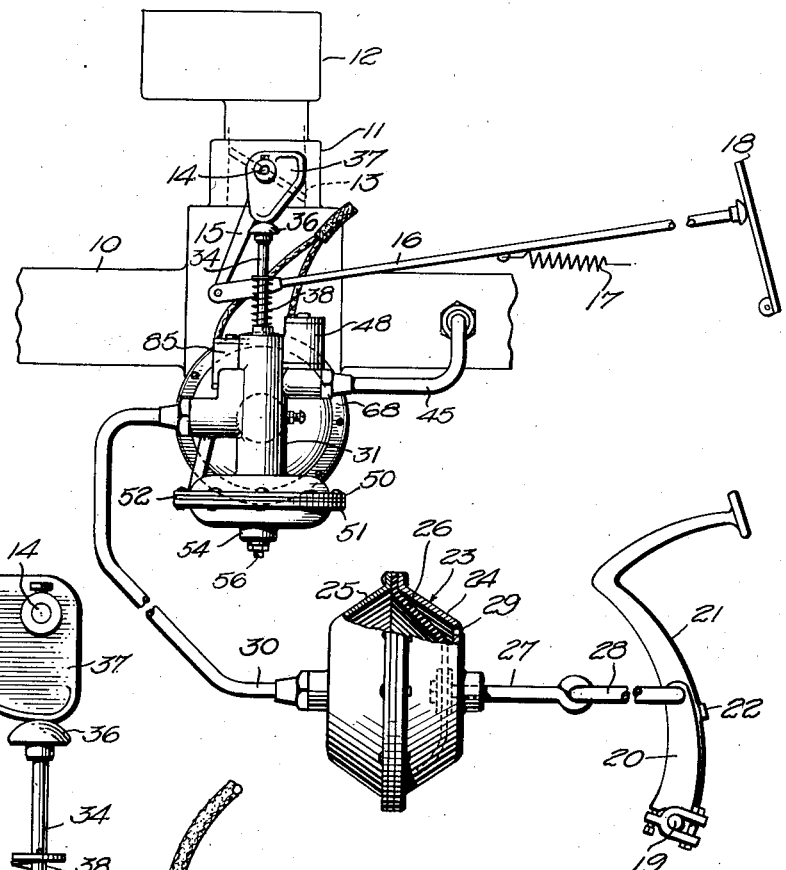
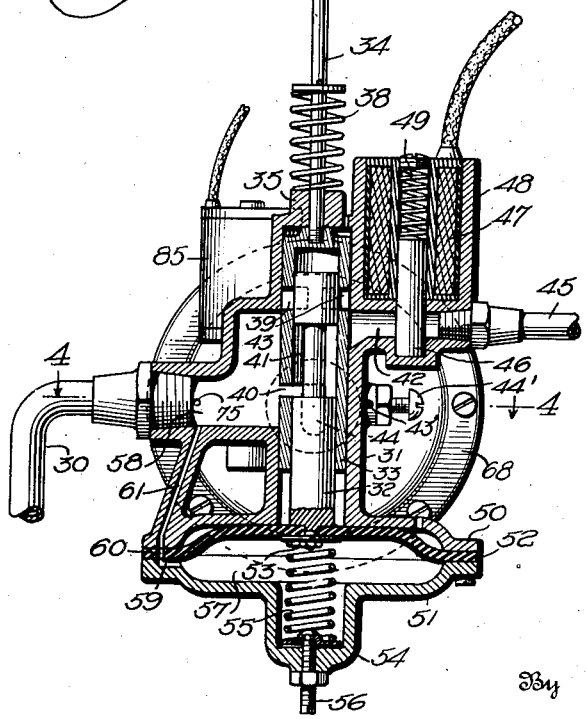
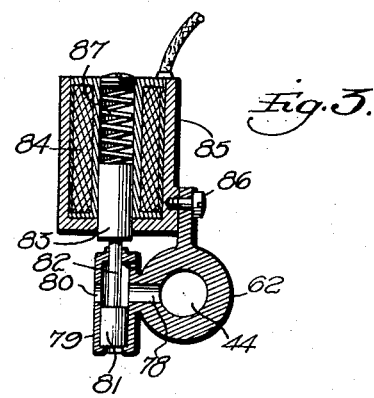
Inventor
EDWARD G. HILL
By C. L. Parker Jr.
Attorney June 8, 1937. E. G. HILL 2,083,530
CLUTCH CONTROL MECHANISM
Filed Oct. 22, 1934 2 Sheets-Sheet 2
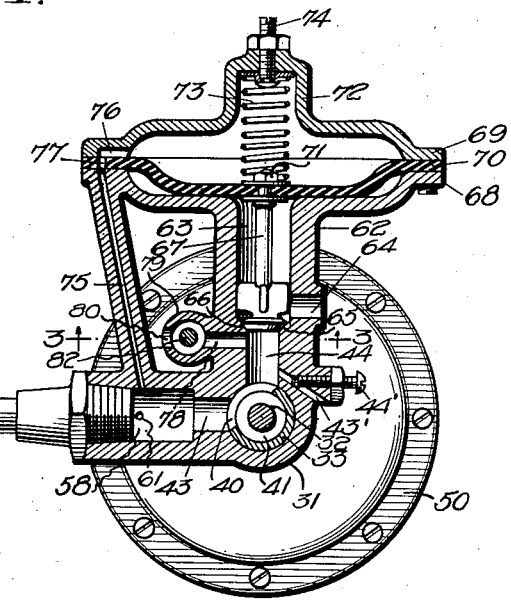
Fig. 4.
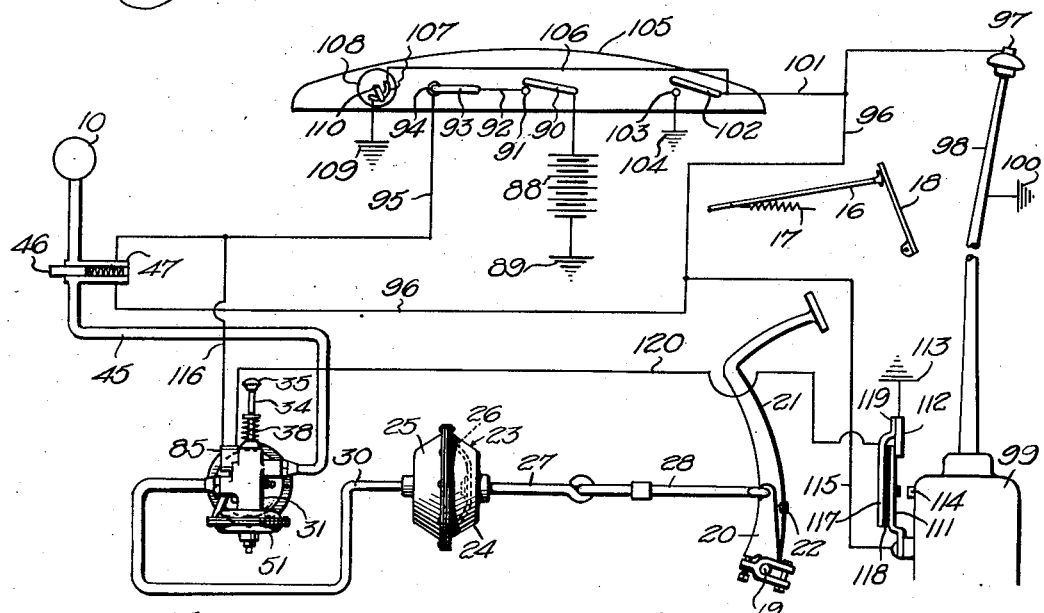
Fig. 5.
Fig. 6.
Inventor
EDWARD G. HILL
C. L. Parker Jr.
Attorney Patented June 8, 1937

2,083,530

UNITED STATES PATENT OFFICE 2,083,530

CLUTCH CONTROL MECHANISM

Edward G. Hill, South Bend, Ind., assignor to Hill Engineering Corporation, Richmond, Va., a corporation of Virginia Application October 22, 1934, Serial No. 749,451

28 Claims. (Cl. 192—.01)

This invention relates to clutch control mechanisms for motor vehicles.

In my prior Patent No. 1,964,693, issued June 26, 1934, I have described and claimed a valve mechanism which is particularly efficient in operation for controlling the clutch of a motor vehicle. The valve mechanism includes a pair of relatively movable valves, one controlled by movement of the accelerator pedal and the other in accordance with the operation of the power device, the first named valve being movable in one direction to actuate the power device and disengage the clutch and movable in the other direction for releasing the clutch for movement into operative engagement. The second valve operates in conjunction with the first named valve to cut off communication between the power device and the atmosphere to check the movement of the clutch elements usually at the point of initial engagement, and the second named valve acts as a follow-up in conjunction with the first named valve to control engagement of the clutch elements in accordance with the rate of operation of the accelerator.

The control valves referred to have been found particularly satisfactory and efficient in operation for providing rapid clutch disengagement upon the releasing of the accelerator pedal and smooth engagement of the clutch elements upon depression of the accelerator, provided the accelerator is not operated faster than a predetermined speed. For all ordinary operations of the accelerator it is not necessary to operate the accelerator faster than the predetermined speed referred to, except possibly in high gear, and accordingly the two cooperating valves referred to are capable of fully controlling the operation of the clutch.

However, many drivers follow the practice of operating the accelerator relatively rapidly in order to secure rapid vehicle acceleration, and in order to govern operation of the valve mechanism to prevent too rapid engagement of the clutch, the prior construction referred to employs what may be termed the "second check" valve which operates to take the control of the clutch engaging function away from the cooperating valves referred to to prevent too rapid clutch engagement upon the relatively rapid operation of the accelerator. However, it is the common practice in the conventional operation of a vehicle to completely release the clutch pedal relatively rapidly when in high gear, which operation is wholly possible without any jerking or lunging of the vehicle, due to the fact that when the shift is made into high gear, the vehicle is traveling under substantial momentum. Accordingly, it is not desirable to retard too greatly the engagement of the clutch elements when the vehicle is in high gear.

An important object of the present invention is to provide means for controlling a power device connected to a vehicle clutch for effecting disengagement and then engagement of the clutch, with proper control means for preventing the too rapid engagement of the clutch elements in first, second and reverse gears, and to provide means for rendering the control means inoperative when the vehicle is in high gear to permit clutch engagement to take place relatively rapidly.

A further object is to provide a device of the character referred to having control means operative under most conditions for limiting the speed of movement of the clutch elements into engagement with each other, and to provide means operative by some portion of the gear set when the gear shift lever is in high gear to permit the rate of clutch engagement to be determined wholly in accordance with the rate of operation of the accelerator.

A further object is to provide a control valve mechanism for a differential pressure power device connected to a motor vehicle clutch, together with means operable under most conditions for limiting the speed of movement of the clutch elements into engagement with each other by limiting the rate at which pressure equalization can be established in the power device, and to provide means for rendering said last named means inoperative to permit relatively rapid clutch engagement when the vehicle is in high gear.

A further object is to provide a control valve mechanism of the character referred to operative for exhausting air from one side of the power device and having an atmospheric passage provided with a control or "second check" valve normally operative for limiting the admission of air into the power device upon the relatively rapid operation of the accelerator, and to provide means in said passage for admitting air thereto independently of said second check valve to prevent the latter from limiting the admission of air into the power device when the vehicle is in high gear, but thus permit relatively rapid clutch engagement.

Other objects and advantages of the invention will become apparent during the course of the following description.

In the drawings I have shown two embodiments of the invention. In this showing:

Figure 1 is a side elevation of portions of a motor vehicle power plant showing the invention applied, Figure 2 is a central vertical sectional view through the valve mechanism, parts being shown in elevation, Figure 3 is a detail sectional view of an auxiliary control valve taken on line 3—3 of Figure 4, Figure 4 is a sectional view taken substantially on line 4—4 of Figure 2, Figure 5 is a diagrammatic view illustrating the electrical connections for the apparatus, and, Figure 6 is a diagrammatic view illustrating a modification of the wiring connections.

Referring to Figure 1, the numeral 10 designates the manifold of a motor vehicle engine having a riser 11 provided with a carbureter 12 at its upper end. A throttle 13 controls the admission of fuel into the manifold and is mounted upon the usual shaft 14. An arm 15 is connected at one end to the shaft 14, and at its other end the arm 15 is connected to one end of an operating rod 16 having a return spring 17. The rod 16 is actuated in the usual manner by an accelerator pedal 18.

The vehicle is provided with the usual clutch (not shown) operated by the usual clutch shaft 19. An arm 20 is operatively connected to the shaft 19 to transmit movement thereto. A pedal 21 is loosely mounted on the shaft 19 and is provided with a lug 22 engageable with the arm 20 when the pedal 21 is depressed, to effect disengagement of the clutch. It will be apparent that the arm 20 is movable for effecting clutch disengagement without transmitting movement to the pedal 21.

A power device indicated as a whole by the numeral 23 is employed for actuating the arm 20. The power device may be of the type illustrated in my prior patent referred to including a pair of casing sections 24 and 25 having a diaphragm 26 clamped therebetween and secured to one end of a pull rod 27. The rod 27 may be connected in any suitable manner to the arm 20, as through a flexible member 28. The casing section 24 is in constant communication with the atmosphere through any suitable means such as a port 29, and the casing section 25 is adapted to be connected to a source of vacuum in a manner to be described, through a pipe or conduit 30.

The numeral 31 designates a valve casing or cylinder having a pair of concentric relatively slidable valves 32 and 33 therein. The valve 33 is provided with a stem 34 extending through the head 35 of the valve cylinder 31 and provided at its upper end with a knob 36. A cam 37 is carried by the throttle shaft 14 and operates to move the valve 33 downwardly to the position shown in Figure 1 when the throttle is in idling position. The cam is shown in Figure 2 in the position corresponding to the fully open throttle position, and as the throttle moves toward open position the cam 37 releases the stem 34 for upward movement. A spring 38 surrounds the stem 34 and tends to move the latter upwardly together with the valve 33.

The valve 33 is provided with opposite arcuate ports 39 toward its upper end, and an arcuate atmospheric port 40 is formed in the valve 33 at a point spaced a substantial distance below the ports 39. The valve 33 is provided with a cutout portion 41 adapted to communicate with the ports 40 or 39 or to assume a neutral position out of communication with both sets of these ports. The ports 39 are vacuum ports and are adapted to establish communication between a passage 42 and an elongated port 43, both formed in the casing 31 at opposite sides thereof. The port 40 is adapted under certain conditions to establish communication between the port 43 and an atmospheric passage 44 (see Figure 4). The passage 44 communicates with the atmosphere through a restricted passage 43', the effective area of which is adjustable by a screw 44'.

The passage 42 communicates with the intake manifold through a pipe 45 and a valve 46 controls communication through the passage 42. This valve forms the armature of a solenoid 47 arranged in a casing 48, preferably formed integral with the casing 31, and a light spring 49 is preferably employed for urging the valve 46 downwardly to closed position. The solenoid is adapted to be energized in a manner to be described to open the passage 42, and under other conditions, the solenoid 47 is deenergized to permit the valve 46 to close and thus render the valves 32 and 33 ineffective.

The lower end of the valve housing 31 is provided with a circular enlargement 50 forming one of a pair of complementary casing sections, the other of which is indicated by the numeral 51. A diaphragm 52 is clamped between these casing sections and is connected as at 53 to the lower end of the valve 32. The casing section 51 is formed with an axial extension 54 in which is arranged a spring 55 operating against the valve 32 to tend to urge it upwardly. The spring 55 is provided with suitable tension adjusting screw means 56. The diaphragm 52 and casing section 51 form a vacuum chamber 57, which is influenced by the vacuum communicated to the power device. The port 43 communicates with a passage 58, leading to the conduit 30, and the chamber 57 communicates with the passage 58 through ports 59 and 60, formed in the casing section 51 and diaphragm 52 respectively, and through a small passage 61.

Referring to Figure 4 the numeral 62 designates an extended portion of the casing 31 extending laterally therefrom. The outer portion of the extension 62 is provided with a chamber 63 communicating with the atmosphere through a relatively large port 64. A valve 65 is engageable in a seat 66 to disconnect the chamber 63 from the passage 44. The valve 65 is mounted on a stem 67 suitably guided for axial movement in the chamber 63.

The outer end of the extension 62 is provided with a circular enlargement 68 forming one of a pair of casing sections the other of which is indicated by the numeral 69. A diaphragm 70 is clamped between the casing sections 68 and 69 and is secured at its central portion to the valve stem 67, as at 71. The interior of the casing section 68 obviously is in constant communication with the atmosphere through the chamber 63 and the port 64. The casing section 69 is provided with an axial extension 72 receiving the outer end of a compression spring 73. The inner end of this spring seats against the diaphragm 70 to urge the valve 65 toward closed position, and suitable screw adjusting means 74 extends through the outer end of the extension 72 to engage against and adjust the tension of the spring 73. A passage 75 has one end communicating with the passage 58, and the other end of the passage 75 communicates with the chamber formed within the casing section 69 through ports 76 and 77 formed respectively in the casing section 69 and diaphragm 70.

The elements of the device previously described form the subject matter of my prior Patent No. 1,964,693, previously described, and in Figures 3 and 4 the valve mechanism constituting the improvement forming the subject matter of the present invention is illustrated in detail. A conduit 78 of substantial area is formed integral with the valve housing and communicates at one end with the passage 44. It will be apparent that the functioning of the passage 78, in a manner to be described, cannot be affected by the position of the valve 65, since the passage 78 is arranged between the valve 65 and the valve 33. At its other end, the passage 78 communicates with the interior of a small valve cylinder 79, and opposite the passage 78, the cylinder 79 communicates with the atmosphere as at 80.

A valve 81 is arranged in the cylinder 79 and is carried by a reduced stem 82. The upper end of the stem 82 is connected to an armature 83 operable in a solenoid 84. This solenoid may be arranged within a casing 85 secured to the main valve casing as at 86. Energization of the solenoid 84 moves the valve 81 to a position closing communication between the port 80 and passage 78, while deenergization of the solenoid drops the valve 81 to the position shown in Figure 3 to open communication between the port 80 and passage 78. A light spring 87 may be employed for insuring downward movement of the valve 81 upon deenergization of the solenoid 84.

A wiring diagram for the electrical elements of the device is illustrated in Figure 5. The vehicle battery is indicated by the numeral 88 and is grounded at one side as at 89. The other side of the battery is connected to an ignition switch 90 which is movable into closed position into engagement with a contact 91. This contact is connected to the ignition system (not shown) in accordance with the usual practice. The contact 91 is connected by a wire 92 to a switch 93 engageable with a contact 94. As will become apparent, the switch 93 constitutes a lock out switch for the clutch control mechanism whereby the opening of the switch prevents automatic operation of the clutch to permit foot operation thereof. A wire 95 is connected at one end to the contact 94 and at its opposite end to one of the terminals of the solenoid 47. In this connection it will be noted that the solenoid 47, in practice, is constructed substantially in accordance with the showing in Figure 2 with the casing 48 integral with the casing 41, and for the purpose of illustration, the solenoid has been shown separate from the valve casing in Figure 5, arranged in the conduit 45.

The other terminal of the solenoid 47 is connected to a wire 96 leading to a button switch 97 arranged on the gear shift lever 98 associated with the usual gear set 99. The lever 98 is indicated as being grounded as at 100. A wire 101 leads from the wire 96 to a switch 102 engageable with a contact 103 grounded as at 104. It will be noted that the switches 90, 93 and 102 are indicated as being mounted on the instrument panel 105, but it is apparent that these switches may be arranged in any suitable position. A wire 106 is connected between the wire 101 and an arcuate contact 107 associated with the speedometer 108. The contact 107 is grounded as at 109 and is engageable by a brush 110 operable by the speedometer in accordance with vehicle speed. The brush 110 remains in engagement with the contact 107 from zero vehicle speed up to any predetermined maximum speed, such as from 8 to 10 miles per hour.

A switch 111 has one end supported with respect to the gear set 99 and is normally in engagement with a contact 112 grounded as at 113. The second and high gear shift rod 114 of the gear set moves forwardly when the gear shift is in high gear position to move the switch 111 out of engagement with the contact 112. The switch 111 is connected to the wire 96 by a wire 115.

The solenoid 84 has one terminal connected by a wire 116 to the wire 95. A second switch arm 117 is carried by and insulated from the switch 111 as at 118 and the upper end of the switch 117 turns inwardly as at 119 for normal engagement with the contact 112. A wire 120 connects the switch arm 117 to the other terminal of the solenoid 84.

The operation of the apparatus is as follows:
The operation of the valves 32, 33 and 65 is described in detail in my prior Patent No. 1,964,693, referred to above. When the throttle is in the idling position shown in Figure 1, the high point of the cam 37 holds the valve 32 in its lowermost position, in which case, communication is afforded between the power device and the intake manifold between pipes 30 and 35, through ports 39 and the reduced portion 41 of the valve 32. The partial vacuum existing in chamber 43 due to communication between this chamber and the passage 58 holds the diaphragm 52 and valve 32 in their lower positions, but since the valve 33 is also in its lowermost position, the port 40 will be arranged beneath the reduced valve portion 41 to disconnect the port 43 from the atmosphere.

Upon opening movement of the throttle 13 incident to depression of the accelerator pedal 18, the high point of the cam 37 will move away from the button 36, thus permitting the valve 33 to move upwardly. This action cuts off communication between the power device and the manifold 10 and opens the power device for limited communication with the atmosphere through port 40 and the cut out valve portion 41, passage 44 (see Figure 4), chamber 63 and port 64. The clutch elements will immediately move toward engaged position and during their initial movement, a partial vacuum will be retained in the diaphragm chamber 57 to prevent substantial upward movement of the valve 32. Upon the initial contacting of the clutch elements, a slight increase in pressure will occur in the chamber 57, thus permitting sufficient further upward movement of the valve 32 to close the port 40 and thus disconnect the power device from the atmosphere and arrest the movement of the clutch elements, provided the accelerator pedal is initially slightly depressed and then stopped. If the accelerator pedal is progressively depressed, the clutch elements will be retarded instead of arrested since the valve 33 will be progressively moving upwardly to maintain a slight communication between the atmosphere and the power device through the port 40. The degree of such communication, and hence the rate of movement of the clutch elements will depend upon the speed of movement of the valve 33. Obviously the slower the movement of the valve 33 the less will be the degree of communication with the atmosphere through port 40 and the slower will be the movement of the clutch elements into operative engagement. More rapid opening movement of the throttle transmits a correspondingly more rapid movement to the valve 38, thus tending to maintain an increased degree of communication between the power device and the atmosphere to permit a more rapid clutch engagement.

Accordingly it will be apparent that the valves 32 and 33 are operative for controlling the movement of the clutch elements from the fully disengaged to the fully engaged position, and this is true except upon the relatively rapid opening of the throttle when the vehicle is in first, second or reverse gears. In such gears, it is desirable to provide means for preventing too rapid clutch engagement with the consequent jerking or lunging of the vehicle, which would occur upon rapid operation of the throttle. For this reason the valve 65 and associated parts are provided. The diaphragm 70 is influenced by the degree of vacuum in the power device through the passages 75 and 58, and a relatively slight degree of vacuum is sufficient to hold the valve 65 in open position. Under ordinary conditions of operation of the throttle a sufficient partial vacuum exists in the casing section 69 to prevent the closing of the valve 65, and under such conditions clutch operation is controlled wholly by the valves 32 and 33. Upon the relatively rapid opening movement of the throttle, however, the substantial and rapid increase in pressure resulting from the rush of air through port 40 reacts through the passage 75 to reduce the differential pressure on opposite sides of the diaphragm 70 sufficiently to permit the closing of the valve 65, thus preventing the unrestricted flow of air into the power device. Under such conditions, the admission of such air is restricted by the port 43', thus retarding the movement of the clutch elements and preventing the grabbing thereof.

The foregoing operation takes place if the valve 81 is in closed position, since the passage 44 communicates with the atmosphere only through the passage 43' if both of the valves 65 and 81 are closed. The circuit for the solenoid 84 includes the source 88, switches 90 and 93, wires 95, 116 and 120, switch 117 and contact 112 and grounds 113 and 89. The switch end 119 remains in engagement with the contact 112 at all times except when the gear set is in high gear, and accordingly the solenoid 84 is energized whenever the vehicle is in first, second or reverse gears. Under such conditions, the solenoid 84 holds the valve 81 in closed position, and the admission of air into the power device upon the depression of the accelerator pedal is controlled wholly by the valves 32, 33 and 65 and the port 43'. Thus it will be impossible for the driver to cause any grabbing of the clutch elements by suddenly depressing the accelerator pedal to a substantial extent, when the vehicle is in first, second or reverse gears.

When the clutch is disengaged and the shift is made from second to high gear, such operation takes place with the vehicle ordinarily moving at a substantial speed, and it is the conventional practice to release the clutch pedal relatively rapidly to permit quick clutch engagement. At the same time, the operator will depress the accelerator pedal to accelerate the motor speed to a point substantially corresponding to vehicle speed. This depression of the accelerator pedal takes place relatively rapidly and ordinarily to a substantial extent, and the principal object of the present invention is to provide means operable under such conditions for preventing the operation of the second check valve 65 to permit the clutch elements to move relatively rapidly from the fully disengaged to the fully engaged position.

When the shift is made into high gear, the shift rod 114 moves the switches 111 and 117 out of engagement with the contact 112, and the circuit for the solenoid 84 is thus broken. Deenergization of the solenoid 84 drops the valve 81 to the open position shown in Figure 3, thus opening communication between the port 80 and passage 78. If the operator then depresses the accelerator relatively rapidly and to a substantial extent to accelerate the motor speed to a point corresponding to the vehicle speed, the drop in differential pressure in the power device will release the diaphragm 70 for downward movement, thus closing the valve 65. This operation, however, will not affect the movement of the clutch elements since air will be admitted into the power device through the port 80 and passage 78 and the rate of clutch engagement will depend wholly upon the rate of operation of the valve 33. Thus the valve 78 functions to permit relatively fast clutch engagement in high gear, which is highly desirable.

Thus the valves 32, 33, 65 and 81 cooperate with each other to provide the desired results under all gear shifting conditions. In all gears, the valves 32 and 33 control the entire operation provided the accelerator pedal is not depressed relatively rapidly, and under such conditions, the valves 65 and 81 do not affect clutch operation. The valve 65 functions to prevent the grabbing of the clutch elements and is rendered operable in first, second and reverse gears by the closing of the valve 81. The latter valve, however, moves to open position when the vehicle is in high gear to prevent the functioning of the valve 65.

With the electrical system described, it will be apparent that the solenoid 84 is deenergized at all times when the vehicle is in high gear, regardless of any other conditions, and the valve 81 accordingly remains in open position during such times. As an alternative system, the wiring arrangement illustrated in Figure 6 may be employed, and this system takes care of a condition which should be considered in the controlling of the vehicle. Referring to Figure 6 it will be noted that the switch 117 is eliminated, and the leads 116 and 120 of the solenoid 84 are connected across the wires 95 and 96. Accordingly the solenoid 84 is in parallel with the solenoid 47. Thus it will be apparent that when the vehicle is in high gear, the switch 111 is open, and when the shift is made to high gear at substantial vehicle speeds, the operator may depress the accelerator pedal rapidly and to a substantial extent, and the movement of the clutch elements will be wholly controlled by the valves 32 and 33. If the shift into high gear is made at a relatively low vehicle speed, however, it is not desirable to take the control of the movement of the clutch elements away from the valve 65, since at low vehicle speeds some jerking of the clutch elements may occur. With the system shown in Figure 6, the circuit through the solenoid 85 is established, when the vehicle is in high gear, if the brush 110 is in engagement with the contact 107, and under such conditions, the solenoid 84 will be energized to hold the valve 81 in closed position. Thus it will be apparent that the operation of the valve 81 will be dependent chiefly upon the position of the gear shift lever, but it will be held in closed position even in high gear if the vehicle is traveling at a speed in which the brush 110 is in engagement with the contact 107.

The operation of the remaining portions of the wiring system illustrated in Figure 5 is fully disclosed in my prior Patent No. 1,964,693 previously referred to, and need not be described in detail. When the switch 102 is open and the switches 90 and 93 are closed, the solenoid 47 will be energized to open communication between the passage 42 and the intake manifold when the vehicle is in first, second and reverse gears, the circuit being completed through wires 96 and 115, switch 111, contact 112 and ground 113. This circuit is broken when the vehicle is in high gear, but the shunt circuit from the wire 96 to ground, including wires 101 and 106, contact 107 and brush 110, maintains the solenoid 47 energized in the lower vehicle speeds when the gear shift lever is in high gear position. Above the predetermined speed at which the circuit is completed between the contact 107 and brush 110, the solenoid 47 will be deenergized, thus rendering the valve mechanism wholly inoperative. Under such conditions declutching will not occur upon the releasing of the accelerator pedal and the vehicle engine is permitted to be used as a brake. When the accelerator is released at higher vehicle speeds in high gear, the clutch will thus remain engaged until the vehicle is decelerated to the point at which the brush 110 engages contact 107 at which point the solenoid 47 will be energized to open the valve 46 and communication between the power device and the intake manifold will be completed and declutching will occur.

Full free wheeling is provided by closing the switch 102 in which case the circuit from the wire 96 to the ground will be constantly maintained regardless of the position of the gear shift lever or the brush 110, and declutching will occur at each releasing of the accelerator, regardless of vehicle speed or the position of the gear shift lever. The button 97 is provided to permit declutching to occur at the will of the operator whenever desired. For example, when a vehicle is ascending a steep grade the operator may desire to shift to second gear without awaiting vehicle deceleration to the point at which the brush 110 will engage the contact 107, and under such conditions, the operator may depress the button 97. This action completes a third shunt circuit from wire 96 to button 97, gear shift lever 98 and ground 100. The solenoid 47 will thus be energized and the releasing of the accelerator pedal will effect declutching, whereupon the operator may shift into second gear. The use of the button 97, of course, is unnecessary when the switch 102 is closed, since the closing of this switch permits declutching to be effected at each releasing of the accelerator pedal.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. Clutch control mechanism for a motor vehicle including a clutch, comprising a power device connected to the clutch, control mechanism for effecting actuation of the power device to disengage the clutch and for variably effecting deactuation of the power device to engage the clutch, auxiliary control means automatically operative for limiting the rate of clutch engagement when said control mechanism tends to release the clutch for too rapid engagement, and means for rendering said auxiliary control means ineffective.

2. Clutch control mechanism for a motor vehicle including a clutch and an engine having a throttle therefor, comprising a power device connected to the clutch, control mechanism operative in conjunction with the throttle for effecting actuation of the power device to disengage the clutch and for variably effecting deactuation of the power device to release the clutch for movement into operative engagement, auxiliary control means automatically operative for limiting the rate of clutch engagement when said control mechanism tends to release the clutch for too rapid engagement, and means for rendering said auxiliary control means ineffective.

3. Clutch control mechanism for a motor vehicle including a clutch and an engine having a throttle therefor, comprising a power device connected to the clutch, control mechanism operative for effecting actuation and deactuation of the power device for disengaging the clutch and for releasing it for movement into operative engagement, said control mechanism including a movable member connected to the throttle to determine the rate of deactuation of the power device in accordance with the rate of opening movement of the throttle, auxiliary control means for preventing too rapid engagement of the clutch upon the relatively rapid opening movement of the throttle, and means for rendering said auxiliary control means ineffective.

4. Clutch control mechanism for a motor vehicle including a clutch and an engine having a throttle therefor, comprising a power device connected to the clutch, control mechanism for the power device including a pair of members one of which is operable by the throttle and the other in accordance with the degree of actuation of the power device and operative for effecting actuation and deactuation of the power device for disengaging the clutch elements, and for releasing them for movement into operative engagement in accordance with the rate of opening movement of the throttle, auxiliary control means operative for retarding the movement of the clutch elements into operative engagement when the throttle is opened relatively rapidly, and means for rendering said auxiliary control means ineffective.

5. Clutch control mechanism for a motor vehicle including a clutch and transmission, comprising a power device connected to the clutch, control mechanism for effecting actuation of said power device for disengaging the clutch and for releasing it for movement into operative engagement, auxiliary control means operative for retarding movement of the clutch elements into operative engagement when said control mechanism functions to permit too rapid engagement of the clutch, and means operable by the transmission when the latter is in high gear for rendering said auxiliary control means ineffective.

6. Clutch control mechanism for a motor vehicle including a clutch and transmission, and an engine having a throttle therefor, comprising a power device connected to the clutch, control mechanism operable by the throttle for effecting actuation and deactuation of the power device for disengaging the clutch and releasing it for movement into engagement, auxiliary control means operable upon the relatively rapid opening of the throttle for preventing too rapid engagement of the clutch, and means operable by the transmission when the latter is in high gear for rendering said auxiliary control means ineffective.

7. Clutch control mechanism for a motor vehicle including a clutch and transmission, and an engine having a throttle therefor, comprising a power device connected to the clutch, control mechanism for effecting actuation and deactuation of the power device for disengaging the clutch and releasing it for movement into operative engagement, said control mechanism including a member movable with the throttle to determine the rate of clutch engagement in accordance with the rate of throttle movement, auxiliary control means operable for preventing too rapid engagement of the clutch, and means operable by the transmission when the latter is in high gear for rendering said auxiliary control means ineffective.

8. Clutch control mechanism for a motor vehicle including a clutch and transmission, and an engine having a throttle therefore, comprising a power device connected to the clutch, control mechanism for effecting actuation and deactuation of said power device for disengaging the clutch and releasing it for movement into operative engagement, said control mechanism including a pair of elements, one operable by the throttle and the other by the power device to release the clutch for movement to operative engagement in accordance with the rate of movement of the throttle, auxiliary control means operable for preventing too rapid clutch engagement upon the relatively rapid opening movement of the throttle, and means operable by the transmission when the latter is in high gear for rendering said auxiliary control means ineffective.

9. Clutch control mechanism for a motor vehicle including a clutch, comprising a differential pressure power device connected to the clutch, control valve mechanism for effecting actuation of the power device to disengage the clutch and for variably effecting deactuation of the power device to release the clutch for movement into operative engagement, auxiliary control valve means automatically operable for limiting the rate of clutch engagement when said control valve mechanism tends to release the clutch for too rapid engagement, and a valve operable for rendering said control valve means ineffective.

10. Clutch control mechanism for a motor vehicle including a clutch, and an engine having a throttle therefor, comprising a differential pressure power device connected to the clutch, control valve mechanism operable in accordance with the rate of operation of the throttle for effecting actuation and deactuation of the power device for disengaging the clutch and for releasing it for movement into operative engagement, auxiliary control valve means operable for preventing too rapid engagement of the clutch upon the relatively rapid opening movement of the throttle, and a valve operable for rendering said auxiliary control valve means completely ineffective.

11. Clutch control mechanism for a motor vehicle including a clutch, and an engine having a throttle therefor, comprising a differential pressure power device connected to the clutch, a control valve mechanism for effecting actuation and deactuation of the power device for disengaging the clutch and releasing it for movement into operative engagement, said control valve mechanism including a main valve operable by the throttle to control clutch engagement in accordance with the rate of opening movement of the throttle, auxiliary control valve means for preventing too rapid engagement of the clutch upon the relatively rapid opening movement of the throttle, and a valve operable for rendering said auxiliary control valve means completely ineffective.

12. Clutch control mechanism for a motor vehicle including a clutch, and an engine having a throttle therefor, comprising a differential pressure power device connected to the clutch, control valve mechanism for effecting actuation and deactuation of said power device for disengaging the clutch and releasing it for movement into operative engagement, said control valve mechanism including a pair of cooperating valves one of which is operable by the throttle and the other of which is operable by the power device whereby the rate of movement of the clutch into operative engagement is controlled in accordance with the rate of opening movement of the throttle, auxiliary control valve means operable for preventing the too rapid engagement of the clutch upon the relatively rapid opening movement of the throttle, and a valve operable for rendering said control valve means completely ineffective.

13. Clutch control mechanism for a motor vehicle engine including a clutch and transmission, comprising a differential pressure power device connected to the clutch, control valve mechanism for effecting actuation and deactuation of the power device for disengaging the clutch and releasing it for movement into operative engagement, auxiliary control valve means operable for preventing too rapid engagement of the clutch, and a valve operable by the transmission when the latter is in high gear for rendering said auxiliary control valve means ineffective.

14. Clutch control mechanism for a motor vehicle including a clutch and transmission, and an engine having a throttle therefor, comprising a differential pressure power device connected to the clutch, control valve mechanism operable in accordance with the rate of operation of the throttle for effecting actuation and deactuation of the power device for disengaging the clutch and for releasing it for movement into operative engagement, auxiliary control valve means operable for preventing too rapid engagement of the clutch upon the relatively rapid opening movement of the throttle, and a valve operable by the transmission when the latter is in high gear for rendering said auxiliary control valve means ineffective.

15. Clutch control mechanism for a motor vehicle including a clutch and transmission, and an engine having a throttle therefor, comprising a differential pressure power device connected to the clutch, a control valve mechanism for effecting actuation and deactuation of the power device for disengaging the clutch and releasing it for movement into operative engagement, said control valve mechanism including a main valve operable by the throttle to control clutch engagement in accordance with the rate of opening movement of the throttle, auxiliary control valve means for preventing too rapid engagement of the clutch upon the relatively rapid opening movement of the throttle, and a valve operable by the transmission when the latter is in high gear for rendering said auxiliary control valve means ineffective.

16. Clutch control mechanism for a motor vehicle including a clutch and transmission, and an engine having a throttle therefor, comprising a differential pressure power device connected to the clutch, control valve mechanism for effecting actuation and deactuation of said power device for disengaging the clutch and releasing it for movement into operative engagement, said control valve mechanism including a pair of cooperating valves one of which is operable by the throttle and the other of which is operable by the power device whereby the rate of movement of the clutch into operative engagement is controlled in accordance with the rate of opening movement of the throttle, auxiliary control valve means operable for preventing the too rapid engagement of the clutch upon the relatively rapid opening movement of the throttle, and a valve operable by the transmission when the latter is in high gear for rendering said auxiliary control valve means ineffective.

17. Clutch control mechanism for a motor vehicle including a clutch, comprising a differential pressure power device connected to the clutch, control valve mechanism for effecting actuation of said power device to disengage the clutch and for variably effecting deactuation of said power device to release the clutch for movement into operative engagement, a fluid passage connected to the atmosphere for establishing pressure equalization in said power device when the latter is deactuated, a valve controlling communication through said fluid passage for limiting the rate of clutch engagement when said control valve mechanism tends to release the clutch for too rapid movement into operative engagement, and a valve operative for opening said passage to the atmosphere independently of said last named valve for rendering the latter ineffective.

18. Clutch control mechanism for a motor vehicle including a clutch, comprising a differential pressure power device connected to the clutch, control valve mechanism for effecting actuation and deactuation of said power device for disengaging the clutch and for releasing it for movement into operative engagement, an atmospheric passage through which pressure equalization is established in said power device when the latter is deactuated, a valve controlling communication through said passage, means for closing said valve upon the relatively rapid reduction in the pressure differential in said power device, and a valve operable for affording communication between said passage and the atmosphere independently of said last named valve to render the latter ineffective.

19. Clutch control mechanism for a motor vehicle including a clutch, comprising a differential pressure power device connected to the clutch, control valve mechanism for effecting actuation and deactuation of said power device for disengaging the clutch and for releasing it for movement into operative engagement, a passage connected between the power device and the atmosphere for establishing pressure equalization therein, a valve controlling communication between said passage and the atmosphere, a pressure responsive device connected to said valve and operable upon the relatively rapid reduction of the differential pressure in said power device for closing said valve, and a valve controlling communication between said passage and the atmosphere independently of said last named valve for rendering the latter ineffective.

20. Clutch control mechanism for a motor vehicle including a clutch and transmission, comprising a differential pressure power device connected to the clutch, control valve mechanism for effecting actuation and deactuation of said power device for disengaging the clutch and for releasing it for movement into operative engagement, a passage connected between the power device and the atmosphere for reducing the pressure differential in said power device when the latter is deactuated, a valve controlling communication through said passage and movable to closed position upon the relatively rapid reduction in the pressure differential in said power device, and a valve controlling communication between said passage and the atmosphere independently of said last named valve and connected to the transmission to be opened thereby when the latter is in high gear.

21. Clutch control mechanism for a motor vehicle including a clutch and transmission, comprising a differential pressure power device connected to the clutch, control valve mechanism for effecting actuation and deactuation of said power device for disengaging the clutch and for releasing it for movement into operative engagement, a passage connected between said power device and the atmosphere for reducing the pressure differential in said power device when the latter is deactuated, a valve controlling communication through said passage, means for closing said valve upon the relatively rapid reduction in the pressure differential in said power device, and a valve controlling communication between said passage and the atmosphere independently of said last named valve and movable to closed position by the transmission when the latter is in high gear.

22. Clutch control mechanism for a motor vehicle including a clutch, comprising a differential pressure power device connected to the clutch, control valve mechanism for effecting actuation and deactuation of said power device for disengaging the clutch and for releasing it for movement into operative engagement, said control valve mechanism including an atmospheric passage adapted to be opened by said valve mechanism to reduce the pressure differential in said power device when the latter is deactuated, a valve controlling communication between said passage and the atmosphere and operable for restricting communication through said passage upon the relatively rapid reduction in the pressure differential in said power device, and a valve controlling communication between said passage and the atmosphere independently of said last named valve and movable to open position to render the latter ineffective.

23. Clutch control mechanism for a motor vehicle including a clutch, comprising a differential pressure power device connected to the clutch, control valve mechanism for effecting actuation and deactuation of said power device for disengaging the clutch and for releasing it for movement into operative engagement, said control valve mechanism including an atmospheric passage adapted to be opened by said valve mechanism to reduce the pressure differential in said power device when the latter is deactuated, a valve controlling communication between said passage and the atmosphere, means responsive to a relatively rapid decrease in the differential pressure in said power device for closing said valve, and a valve controlling communication between said passage and the atmosphere independently of said last named valve and movable to open position for rendering the latter ineffective.

24. Clutch control mechanism for a motor vehicle including a clutch and transmission, comprising a differential pressure power device connected to the clutch, control valve mechanism for effecting actuation and deactuation of said power device for disengaging the clutch and for releasing it for movement into operative engagement, said control valve mechanism including an atmospheric passage adapted to be opened by said valve mechanism to reduce the pressure differential in said power device when the latter is deactuated, a valve controlling communication between said passage and the atmosphere and operable for restricting communication through said passage upon the relatively rapid reduction in the pressure differential in said power device, and a valve controlling communication between said passage and the atmosphere independently of said last named valve and movable to open position by the transmission when the latter is in high gear.

25. Clutch control mechanism for a motor vehicle including a clutch and transmission, comprising a differential pressure power device connected to the clutch, control valve mechanism for effecting actuation and deactuation of said power device for disengaging the clutch and for releasing it for movement into operative engagement, said control valve mechanism including an atmospheric passage adapted to be opened by said valve mechanism to reduce the pressure differential in said power device when the latter is deactuated, a valve controlling communication between said passage and the atmosphere, means responsive to a relatively rapid decrease in the differential pressure in said power device for closing said valve, and a valve controlling communication between said passage and the atmosphere independently of said last named passage and movable to open position by the transmission when the latter is in high gear.

26. Clutch control mechanism for a motor vehicle including a clutch and transmission, comprising a power device connected to the clutch, control mechanism for effecting actuation and deactuation of the power device for disengaging the clutch, auxiliary control means operative for preventing the too rapid engagement of the clutch, means for rendering said auxiliary control means ineffective when the vehicle is in high gear, and means for rendering said last named means ineffective when the transmission is in high gear and the vehicle is traveling below a predetermined speed.

27. Clutch control mechanism for a motor vehicle including a clutch and transmission, comprising a power device connected to the clutch, control mechanism for effecting actuation of said power device for disengaging the clutch and for releasing it for movement into operative engagement, auxiliary control means operative for preventing too rapid engagement of the clutch, means operable for rendering said auxiliary control means ineffective when the transmission is in high gear, and means for rendering said last named means ineffective when the transmission is in high gear and the vehicle is traveling below a predetermined speed.

28. Clutch control mechanism for a motor vehicle engine including a clutch and transmission, comprising a differential pressure power device connected to the clutch, control valve mechanism for effecting actuation and deactuation of the power device for disengaging the clutch and for releasing it for movement into operative engagement, auxiliary control valve means operable for preventing too rapid engagement of the clutch, a valve operable for rendering said auxiliary control valve means ineffective when the transmission is in high gear, and means for rendering said valve ineffective when the transmission is in high gear and the vehicle is traveling below a predetermined speed.

EDWARD G. HILL.